United States Patent
Ruffet et al.

(10) Patent No.: US 10,400,641 B2
(45) Date of Patent: Sep. 3, 2019

(54) FLUID SUPPLY SYSTEM

(71) Applicant: Mahle International GmbH, Stuttgart (DE)

(72) Inventors: Valentin Ruffet, Ostfildern (DE); Michael Steinhoff, Ludwigsburg (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 16/060,023

(22) PCT Filed: Nov. 25, 2016

(86) PCT No.: PCT/EP2016/078772
§ 371 (c)(1),
(2) Date: Jun. 6, 2018

(87) PCT Pub. No.: WO2017/097605
PCT Pub. Date: Jun. 15, 2017

(65) Prior Publication Data
US 2018/0355771 A1 Dec. 13, 2018

(30) Foreign Application Priority Data

Dec. 7, 2015 (DE) ......... 10 2015 224 387
May 3, 2016 (DE) ......... 10 2016 207 655

(51) Int. Cl.
*F01M 1/16* (2006.01)
*F01M 1/10* (2006.01)
(Continued)

(52) U.S. Cl.
CPC ........... *F01M 1/16* (2013.01); *F01M 1/10* (2013.01); *F01M 5/00* (2013.01); *F01M 5/007* (2013.01);
(Continued)

(58) Field of Classification Search
CPC .. F01M 1/16; F01M 1/02; F01M 1/10; F01M 1/20; F01M 2005/008
See application file for complete search history.

(56) References Cited

U.S. PATENT DOCUMENTS 3,465,847 A 9/1969 Siegfried et al.
4,798,561 A 1/1989 Hattori et al.
(Continued)

FOREIGN PATENT DOCUMENTS

DE 1476088 A1 3/1969
DE 19902408 A1 8/2000
(Continued)

OTHER PUBLICATIONS

Japanese Office Action dated Oct. 30, 2018 for Application No. 2018-526183 (English translation).
(Continued)

*Primary Examiner* — Long T Tran
(74) *Attorney, Agent, or Firm* — Fishman Stewart PLLC

(57) ABSTRACT

A fluid supply system may include a component and a bypass valve including a valve body arranged in a control channel. The valve body may be adjustable at least between a first position and a second position, the valve body cutting off a fluid channel to the component when in the first position and cutting off a bypass channel bypassing the component when in the second position. The valve body may divide the control channel into a first chamber and a second chamber. The valve body may include a leakage opening connecting the first chamber and the second chamber. The system may also include at least one detection device configured to detect a property of a fluid and transmit the detected property to a control device. The control device
(Continued)

may be configured to close a switchable valve arranged in the leakage channel when the detected property reaches a predefined condition.

20 Claims, 2 Drawing Sheets

(51) Int. Cl.
    *F01M 5/00*         (2006.01)
    *F16K 11/02*      (2006.01)
    *F16N 29/02*      (2006.01)
    *F16H 57/04*      (2010.01)
    *F02B 37/18*       (2006.01)

(52) U.S. Cl.
    CPC ........ *F02B 37/183* (2013.01); *F16H 57/0434* (2013.01); *F16K 11/02* (2013.01); *F16N 29/02* (2013.01); *F01M 2001/1092* (2013.01); *F16N 2200/10* (2013.01)

(56) References Cited

U.S. PATENT DOCUMENTS

| | | | | |
|---|---|---|---|---|
| 5,397,284 | A * | 3/1995 | Matsumoto | F16H 61/0276 475/129 |
| 6,035,958 | A * | 3/2000 | Saita | B62D 5/062 180/417 |
| 2001/0023671 | A1* | 9/2001 | Vorih | F01L 1/18 123/90.12 |
| 2002/0172604 | A1* | 11/2002 | Berger | F01M 1/16 417/307 |
| 2006/0213471 | A1* | 9/2006 | Ogawa | F01L 1/34 123/90.17 |
| 2008/0105307 | A1* | 5/2008 | Andoh | F16K 11/07 137/495 |
| 2011/0126784 | A1* | 6/2011 | Kobayashi | F01M 1/16 123/41.02 |
| 2014/0219847 | A1* | 8/2014 | Watanabe | F04C 2/3442 418/24 |
| 2015/0300218 | A1* | 10/2015 | Taguchi | F01M 1/08 123/196 CP |
| 2017/0051644 | A1* | 2/2017 | Lagerlof | F01M 5/005 |

FOREIGN PATENT DOCUMENTS

| | | |
|---|---|---|
| DE | 19943294 A1 | 3/2001 |
| FR | 2655702 A1 | 6/1991 |
| JP | S56138105 A | 10/1981 |
| JP | S62248812 A | 10/1987 |
| JP | H0329784 U | 3/1991 |
| JP | H04105676 U | 9/1992 |
| JP | H0988533 A | 3/1997 |
| JP | H10288023 A | 10/1998 |
| JP | 2009275583 A | 11/2009 |
| JP | 2013213462 A | 10/2013 |
| WO | 2011070604 A1 | 6/2011 |
| WO | 2012013232 A1 | 2/2012 |
| WO | 2015172792 A1 | 11/2015 |

OTHER PUBLICATIONS

English abstract for JP-H10288023.
English abstract for JP-S56138105.
English abstract for DE-19902408.
English abstract for DE-19943294.
English abstract for FR-2655702.
English abstract for JP-2013213462.
English abstract for JP-2009275583.
English abstract for JP-S62248812.
English abstract for JP-H0988533.

* cited by examiner

FLUID SUPPLY SYSTEM

CROSS-REFERENCE TO RELATED APPLICATIONS

This application claims priority to International Patent Application No. PCT/EP2016/078772, filed on Nov. 25, 2016, and German Patent Application Nos. DE 10 2015 224 387.7, filed on Dec. 7, 2015 and DE 10 2016 207 655.8, filed on May 3, 2016, the contents of all of which are hereby incorporated by reference in their entirety.

TECHNICAL FIELD

The present invention relates to a fluid supply system with a component. The invention further relates to an internal combustion engine having at least one fluid supply system of this kind.

BACKGROUND

DE 199 43 294 A1 discloses a fluid supply system of an internal combustion engine having a filter device and a cooler upstream of said filter device that can be switched on in the fluid circuit in a temperature-dependent manner. In a lower and an upper temperature range, at least a predominant part of the volume flow in this case passes through the cooler, while in a middle temperature range located therebetween, at best a non-predominant part of the volume flow passes through the cooler. In this way, it should be possible for the temperature of the fluid to be optimally adjusted to operating conditions of the internal combustion engine.

An automatic transmission for vehicles with a hydrodynamic converter is known from DE 199 02 408 A1, said converter being supplied with oil by a compressed oil pump via a main pressure valve, wherein a converter safety valve restricts the oil pressure upstream of the converter and a lubricating oil line branches off from the oil supply line, which lubricating oil line contains a lubricating valve and wherein an oil cooler is provided in addition. This oil cooler is arranged in an oil line between the main pressure valve and the branch line of the lubricating oil line and has a bypass, the flow rate whereof is controlled or regulated.

FR 2 655 702 A1 discloses a fluid supply system with a component, wherein a bypass valve with a valve body arranged in a control channel is provided which is adjustable at least between a first position and a second position and which blocks a fluid channel to the component in the first position and a bypass channel bypassing the component in the second position. The valve body itself divides the control channel into a first chamber and a second chamber and, moreover, has a leakage opening which connects the first chamber to the second chamber. A spring element which pretensions the valve body in its second position is arranged in the second chamber in this case. Moreover, the second chamber is connected via a leakage channel to a fluid reservoir, wherein a switchable valve for the at least partial opening and closing of the leakage channel is arranged in this leakage channel. At least one detection device is also provided, in addition, which detects a property of the fluid and transmits it to a control device which is in turn configured in such a manner that it closes the valve when a predefined property is reached and thereby blocks the leakage channel.

A further fluid supply system with a component is known from WO 2015/172792 A1.

A fluid supply system with a control channel and a bypass valve arranged therein is known from JP S62-248812 A. The bypass valve has a valve body which is adjustable at least between a first and a second position and which in the first position cuts off a fluid channel to the component and in the second position cuts off a bypass channel bypassing the component. The valve body in this case divides the control channel into a first and second chamber and, in addition, has a leakage opening which connects the first chamber to the second chamber.

Fluid supply systems in internal combustion engines, for example oil filter modules, are normally fitted with a cooler to protect the fluid, in particular the oil, from damage due to high temperatures during running. In the cold state, however, the pressure loss of the cold fluid rises due to the altered flow properties, which is why a bypass valve fitted with an expansion element is normally provided which, when a predefined temperature is fallen short of or has not yet been reached, directs a fluid flow past the cooler and only conducts said fluid flow through the cooler, for example the oil cooler, when the predefined temperature has been reached. This means that corresponding lubrication of an internal combustion engine or bearing points, for example, should still be achieved even in the cold state.

As an alternative to the aforementioned expansion elements, so-called bi-metal or FGL switches can also be used, wherein all temperature-dependent bypass circuits are comparatively complex and expensive due to the switches used, for example expansion elements, and, moreover, have a certain inertia which means that rapid switching becomes impossible. In addition, bypass valves with so-called wax expansion elements, in particular, usually require a temperature difference of at least 10 Kelvin in order to achieve the working stroke.

SUMMARY

The present invention therefore deals with the problem of indicating an improved fluid supply system with a bypass circuit which has a particularly structurally simple, cost-effective and fast-switching design.

This problem is solved according to the invention by the subject manner of the independent claim(s). Advantageous embodiments are the subject matter of the dependent claim(s).

The present invention is based on the general principle of using a switchable valve, in particular a solenoid valve, for a bypass circuit rather than the expansion elements used for this purpose hitherto but, on account of its comparatively small working stroke, not to use it directly for switching a valve body of the bypass valve, but for opening and closing a leakage channel which influences the pressure conditions necessary for switching the valve body of the bypass valve. The valve provided according to the invention does not therefore move the valve body itself but simply influences the pressure conditions that lead to the rapid movement of the valve body of the bypass valve. The fluid supply system according to the invention has a component in this case, for example a filter device for filtering the fluid or a cooler for cooling the fluid, and also a bypass channel bypassing this component. A bypass valve with a valve body is arranged in a control channel in this case, said valve body being adjustable at least between a first and a second position and cutting off a fluid supply flow to the component in the first position and a fluid flow through the bypass channel in the second position, or vice versa. Intermediate positions between the two positions are of course also possible in this case, in which a partial fluid flow flows to the component and a partial fluid flow flows through the bypass channel. The valve body of the bypass valve in this case divides the control channel into a first and a second chamber and has a leakage opening that connects the first chamber to the second chamber. A spring element is arranged in the second chamber which pretensions the valve body in its second position, wherein the second chamber is connected via a leakage channel to a fluid reservoir. The switchable valve according to the invention, in particular the solenoid valve, by means of which the leakage channel can be opened and closed is provided in this leakage channel. Also provided is a detection device which detects a property, for example a temperature, of the fluid and transmits it to a control device which is in turn designed in such a manner that it closes the valve when a predefined temperature is reached and thereby blocks the leakage channel. The detection device and control device in this case may of course also be combined in an expansion element. With the fluid supply system according to the invention, a fast-switching bypass valve can thereby be created in a structurally simple and cost-effective manner, the switching movement of said bypass valve depending exclusively on the spring force of the spring element, the position of the valve and the pressure of the fluid in the first and second chamber. Compared with an expansion element, the valve in this case can switch comparatively quickly and thereby quickly influence the pressure conditions prevailing in the second chamber, as a result of which, in turn, due to the pressure differential prevailing between the first and second chamber and the spring force, rapid switching of the valve body and therefore of the bypass valve are possible. It is highly advantageous in this case for a very small valve stroke of the valve to be sufficient to block the leakage channel, which valve stroke can be accomplished by a valve of this kind, since the leakage channel has a very small cross section by comparison with the control channel. By means of the comparatively small actuating movement of the valve or the valve body thereof, a large cross section of the control channel can therefore be switched via the valve body of the bypass valve.

In the case of an advantageous development of the solution according to the invention, the fluid supply system is designed as a lubricant supply system, in particular as an oil supply system. Particularly in the case of oil filter modules, the viscosity of the oil in the cold state means that conveying it through an oil cooler must be avoided at all costs, which is why the bypass valve according to the invention can advantageously be used in this case to bring about rapid and effective lubrication, for example of the internal combustion engine or other bearing points, both in the cold and also in the warm state.

With a further advantageous embodiment of the solution according to the invention, the detection device is configured as a temperature detection device and the control device is configured in such a manner that it closes the valve when the temperature T≥117° C. is reached. At a temperature of T≤117° C., on the other hand, the valve remains open, as a result of which a leakage flow flows to the fluid reservoir, in particular to the oil reservoir, and is forced by the pressure differential between the first and second chambers in the control channel of the valve body of the bypass valve into its first position, against the spring force. When a predefined temperature of 117° C. is reached, the valve closes off the leakage channel, so that there can be no more fluid outflow into the fluid reservoir via said leakage channel. After the leakage channel has been blocked off, the pressure rises in the second chamber until it reaches the pressure in the first chamber, following which only the spring force of the spring element is responsible for the displacement of the valve body. The two pressures in the first and second chamber cancel one another out in this case. Due to the spring force of the spring element, the valve body of the bypass valve is moved into its second position in which the bypass channel to the bypass is closed and the fluid channel to the component is open. In this state, the fluid flow is thereby conducted via the component.

According to the invention, the valve body is configured as a valve piston which has a first opening to the bypass channel on the casing side and a second opening to the component on the casing side. This only represents a possible embodiment of the valve body according to the invention which, however, can be produced comparatively easily and cost-effectively and, at the same time, facilitates the pressure conditions in the first and second chambers comparatively easily. For this purpose, the leakage opening is arranged in the floor of the valve piston, for example.

With an advantageous development of the solution according to the invention, the valve piston or the valve body itself is made of metal or of plastic, wherein an embodiment made of metal allows particularly high resistance, even to aggressive fluids. By contrast, by means of an embodiment of the valve piston/valve body made of plastic, comparatively cost-effective production can be achieved.

According to the invention the valve has a solenoid valve or is configured as such. The embodiment as a solenoid valve in particular allows comparatively rapid switching and therefore a quick reaction.

The component may advantageously be configured as a cooler, transmission or filter device. Even this non-definitive list is indicative of the various possible applications that exist for the fluid supply system according to the invention, particularly in the case of an internal combustion engine.

Further important features and advantages of the invention result from the dependent claims, from the drawings and from the associated drawing description with reference to the drawings.

It is evident that the features previously mentioned and those yet to be explained below can be used not only in the combination indicated in each case, but also in other combinations or alone, without departing from the framework of the present invention.

Preferred exemplary embodiments of the invention are depicted in the drawings and are explained in greater detail in the following description, wherein the same reference numbers relate to the same or similar or functionally identical components.

DETAILED DESCRIPTION

Figure 1:
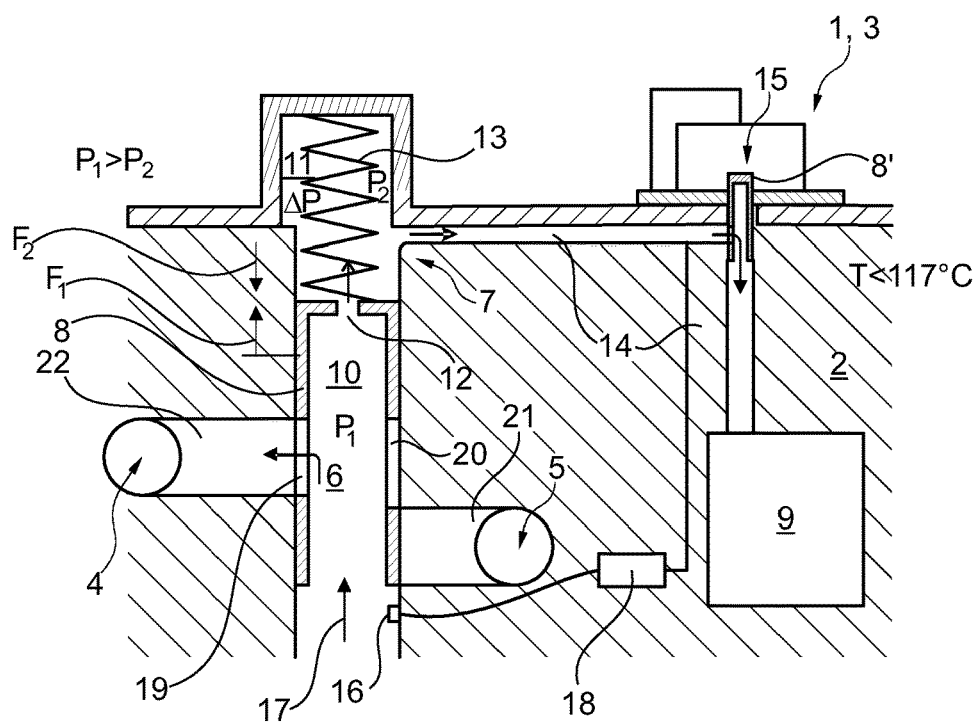
FIG. 1 a fluid supply system according to the invention with a fluid property below a predefined property, FIG. 2 a representation as in FIG. 1, but with a property of the fluid above the predefined property, FIG. 3 a fluid supply system according to the invention with a different valve and with a fluid property below a predefined property, FIG. 4 a representation as in FIG. 3 but with a property of the fluid above the predefined property.

In accordance with FIGS. 1 to 4, a fluid supply system 1 according to the invention, in particular an internal combustion engine 2, for example a lubricant supply system and, in particular, an oil supply system 3, has a component 5 and also a bypass 4 bypassing this. The component 5 may be designed as a cooler, transmission or filter device, for example. According to FIGS. 1 to 4, only the fluid channel 21 to the component 5 and the bypass channel 22 to the bypass 4 are shown in this case, which means that the actual component 5 is located below the image plane shown. In this case, a bypass valve 7 with a valve body 8 is arranged in a control channel 6, said valve body being adjustable between a first position (cf. FIGS. 1 and 3) and a second position (cf. FIGS. 2 and 4) and cutting off the fluid channel 21 to the component 5 in the first position and the bypass channel 22 in the second position. The control channel 6 in this case leads indirectly via a fluid pump which is not shown to a fluid reservoir 9.

If the control channel 6 is observed more closely, it is possible to see that the valve body 8 divides said control channel 6 into a first chamber 10 and a second chamber 11 and, at the same time, has a leakage opening 12 which connects the first chamber 10 to the second chamber 11. Moreover, a spring element 13 is arranged in the second chamber 11 which pretensions the valve body 8 in its second position depicted in FIGS. 2 and 4. The second chamber 11 is, in addition, connected to the fluid reservoir 9 via a leakage channel 14, wherein a valve 15, in particular a solenoid valve, is arranged in the leakage channel 14 for the at least partial opening/closing of the leakage channel 14. According to FIGS. 1 and 3, the valve 15 in this case is shown in its opening position in which the second chamber 11 is connected to the fluid reservoir 9, which is in a pressureless state, via the leakage channel 14. By contrast, FIGS. 2 and 4 show the valve 15 in its closed position. As a general rule, the valve 15 in this case may be a solenoid valve, an electric switch, a bi-metal switch and/or an expansion element 23 (cf. FIGS. 3 and 4). The embodiment as a solenoid valve, as a bi-metal switch or as an electric switch, particularly allows a comparatively rapid switching and therefore fast reaction.

Figure 2:
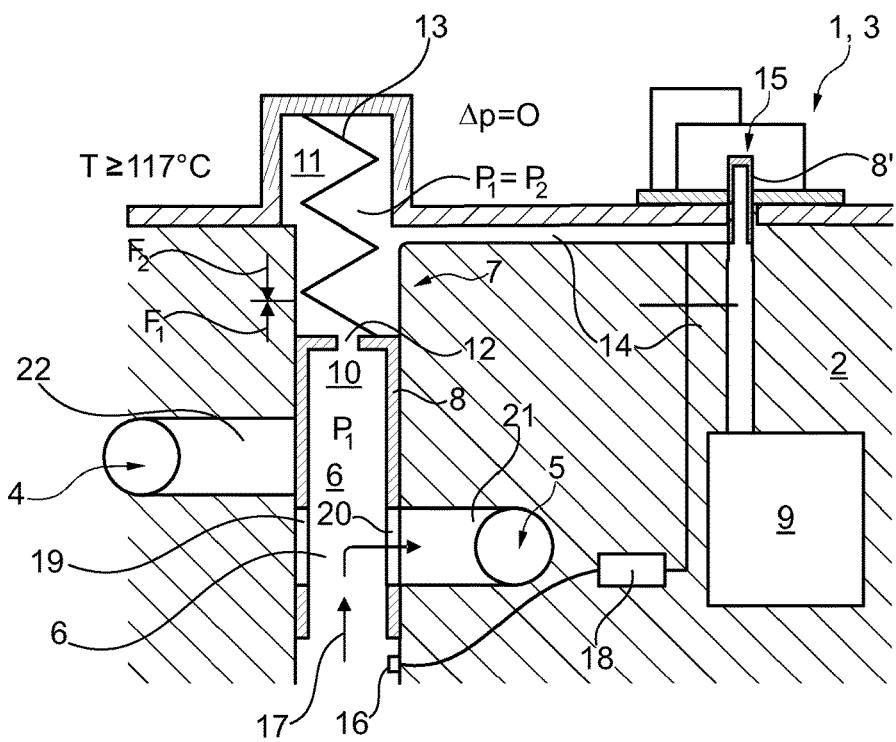

Moreover, the fluid supply system 1 according to the invention as shown in FIGS. 1 and 2 has a detection device 16, for example a temperature detection device with a temperature sensor, which detects a property, in particular the temperature, of the fluid 17, for example oil or lubricant, and transmits it to a control device 18 which, in turn, is configured in such a manner that the valve 15, on reaching a predefined property, for example a predefined temperature T, closes and therefore cuts off the leakage channel 14. To this end, the control device 18 is naturally also connected to the valve 15.

Figure 3:
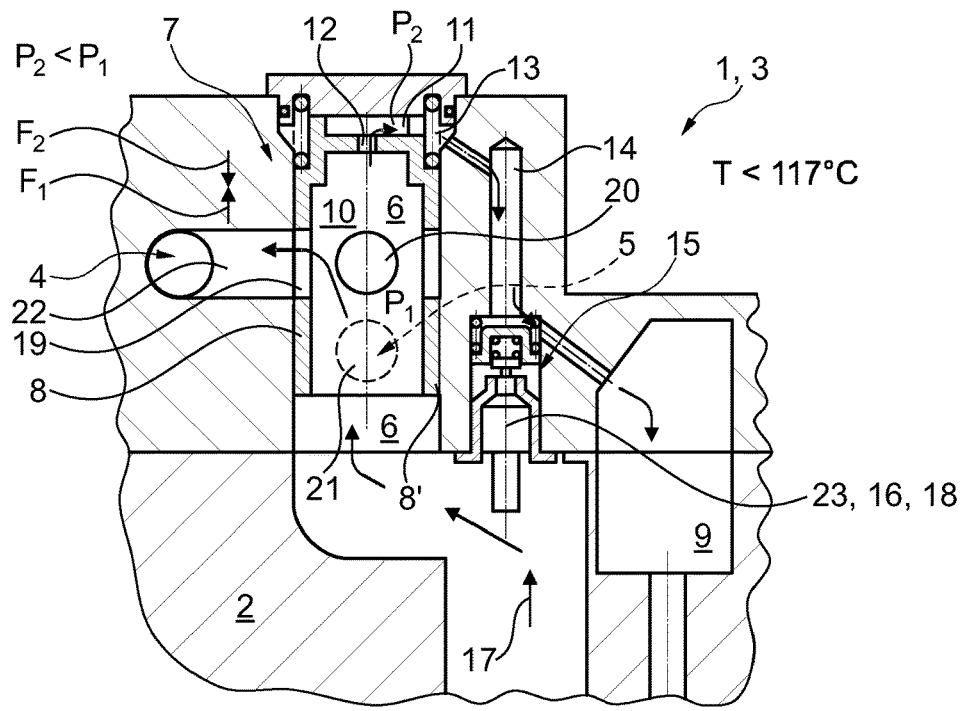
Figure 4:
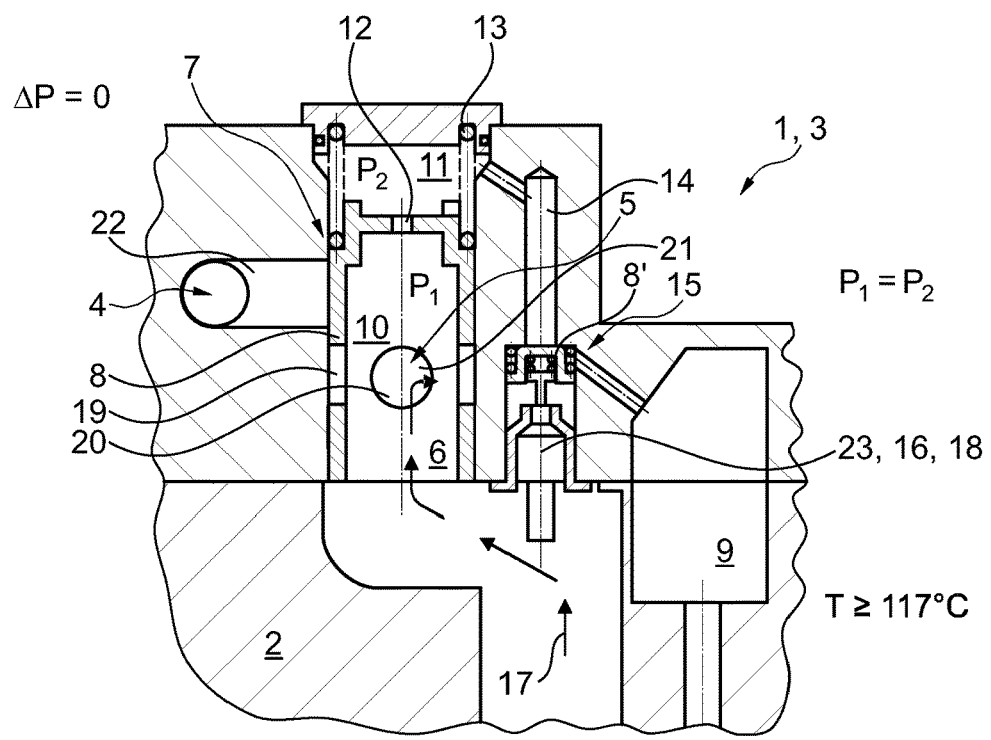

According to FIGS. 3 and 4, the detection device 16 and the control device 18 are integrated in the expansion element 23 or else are created by said element, so that a separate detection device 16 and a separate control device 18 can be dispensed with, which generates cost advantages.

In FIGS. 1 to 4, the detection device 16 is configured as a temperature detection device (expansion element 23 also detects temperature) and therefore detects the temperature of the fluid 17. The predefined temperature T in this case may, for example, be ≥117° C., so that in FIGS. 1 and 3 a state of the fluid supply system 1 according to the invention is shown at a temperature T<117° C. and in FIGS. 2 and 4 at a temperature T≥117° C.

If the valve body 8 is observed more closely, it can be seen that said valve body is configured as a valve piston which has a first opening 19 on the casing side and a second opening 20 on the casing side, wherein depending on the switch setting of the valve body 8, the first opening 19 is flush with the bypass channel 22 to the bypass 4, while the second opening 20 is flush with the fluid channel 21 to the component 5 in the second position. The leakage opening 12 in this case is arranged in a floor of the valve body 8. The valve body itself may, for example, by made of metal or of plastic, wherein the metal embodiment offers particularly great resistance to all fluids 17, while a plastic embodiment can be produced in a comparatively cost-effective manner.

The fluid supply system 1 according to the invention operates in this case according to FIGS. 1 to 4 with a detection device 16 configured as a temperature detection device, as follows:

At a temperature T<117° C., the situation according to FIGS. 1 and 3 arises, at which the temperature detection device 16 (or else the expansion element 23 in FIG. 3) detects the temperature, passes it on to the control device 18 and this then keeps the valve 15 open. The fluid 17 flowing into the control channel 6 thereby produces a pressure $P_1$ in the first chamber 10, wherein it is able to flow via the leakage opening 12 into the second chamber 11 and via this and the open leakage channel 14 into the fluid reservoir 9. The fluid reservoir 9 in this case is usually in a pressureless state, wherein, however, a valve body 8' of the valve 15 may be configured as a throttle, for example, so that ambient pressure does not result in the second chamber 11 but only a lower pressure $P_2$ with respect to the pressure $P_1$ prevailing in the first chamber 10. Between the first chamber 10 and the second chamber 11 there is therefore a pressure differential $\Delta P$ which acts against the spring force of the spring element 13. The force $F_1$ acting on the valve body 8 from below in the present case is measured here using $$F_1 = P_1 \cdot A_{(valve\ body)} - \Delta P \cdot A_{(valve\ body)},$$

whereas the force $F_2$ acting on the valve body 8 from above is measured as follows:

$$F_2 = \Delta P \cdot A_{(valve\ body)} + F_{(spring)}$$

and wherein $$F_1 > F_2.$$

This means that the valve body 8 is displaced upwards until the first opening 19 on the casing side is flush with the bypass channel 22 leading to a filter device, for example, and the fluid 17 can flow into the bypass 4. A small leakage flow of the fluid 17 may also reach the second chamber 11 via the leakage opening 12 and the fluid reservoir 9 via the leakage channel 14.

When the predefined temperature T of ≥117° C. is reached, the bypass valve 7 switches into the position depicted in FIGS. 2 and 4, since when the predefined temperature T is reached, the control device 18 transmits a corresponding signal to the valve 15 and this then moves the valve body 8' into its closed position and blocks the leakage channel 14. If the valve 15 is configured as a solenoid valve or as an electrically switchable valve, opening and closing takes place comparatively quickly, while in the case of a valve 15 with an expansion element 23, a slower opening/closing takes place. In the last case, a separate detection device 16 and a likewise separate control device 18 and also the associated wiring can be dispensed with, since in this case these are supplied by the expansion element 23, which produces cost advantages.

Since the leakage channel 14 has a substantially smaller cross section by comparison with the control channel 6, in this case, too, a valve 15 which only exhibits a small valve stroke but at the same time is fast-switching is used. Following closure of the valve 15, the pressure $P_2$ in the second chamber 11 rises to the pressure $P_1$ in the first chamber 10, producing a ΔP of 0. In this case, there is consequently no further pressure-dependent adjustment of the valve body 8 of the bypass valve 7, as the pressure-dependent force $F_1$ acting on the valve body 8 from below corresponds to the exclusively pressure-dependent force $F_2$ acting on the valve body 8 from above. Despite this, the force $F_2$ acting on the valve body 8 from above is naturally greater than the force $F_1$, since in addition the force $F_{(spring)}$ of the spring element 13 also acts on the valve body 8 from above. The following therefore applies to the state depicted in FIGS. 2 and 4:

$$F_2 > F_1 \text{ where}$$

$$F_2 = P_2 \cdot A_{(valve\ body)} + F_{(spring)}; \text{ and } F_1 = P_1 \cdot A_{(valve\ body)}$$

With the bypass valve 7 according to the invention and the fluid supply system 1 according to the invention, control of the valve body 8 of the bypass valve 7 is possible by means of the spring force $F_{(spring)}$ via the fluid pressure $P_1$, $P_2$ and via the position of the valve body 8' of the valve 15. Depending on whether the valve 15 is open or closed, by means of a targeted design the spring force $F_{(spring)}$ of the spring element 13 of the valve body 8 can open or close the bypass channel 22 to the bypass 4.

Insofar as the valve 15 is configured as a solenoid valve or as an electrically switchable valve, it may of course also be configured in such a manner that it performs a fail-safe function, in other words it has to be energized in order to be moved into the (opening) state depicted in accordance with FIGS. 1 and 3. The valve 15 remains de-energized in the closed state, which means that the fluid 17 or else the oil is always conducted via the component 5 and damage can be avoided.

The predefined temperature T=117° C. depicted in FIGS. 1 to 4 naturally represents only a possible temperature which applies to oil as the fluid 17, for example. Other parameters may of course also be used as the detection variable.

With the fluid supply system 1 according to the invention, a comparatively rapid switching of the bypass valve 7 is therefore possible, without an actuation device with a comparatively large valve stroke being necessary for this, since the valve stroke of the valve 15 for controlling the valve body 8 in the leakage channel 14 is entirely sufficient to influence the pressure conditions $P_1$, $P_2$ and thereby control the bypass valve 7. If an electrically switching or solenoid valve is used for the valve 15, by comparison with wax expansion elements for controlling the bypass valve 7, a substantially quicker reaction time of the bypass valve 7 can be achieved. At the same time, this may have a more cost-effective and structurally simple design.

The invention claimed is:

1. A fluid supply system comprising:
   a component;
   a bypass valve including a valve body arranged in a control channel, the valve body being adjustable at least between a first position and a second position, the valve body cutting off a fluid channel to the component when in the first position and cutting off a bypass channel bypassing the component when in the second position;
   the valve body dividing the control channel into a first chamber and a second chamber, the valve body including a leakage opening connecting the first chamber and the second chamber;
   a spring element arranged in the second chamber configured to pretension the valve body in the second position;
   the second chamber connected to a fluid reservoir via a leakage channel;
   a switchable valve arranged in the leakage channel configured to at least one of i) at least partially open and ii) at least partially close the leakage channel; and
   at least one detection device configured to detect a property of a fluid and transmit the detected property to a control device, the control device configured to close the switchable valve to block the leakage channel when the detected property reaches a predefined condition;
   wherein the switchable valve is a solenoid valve; and
   wherein the valve body is structured as a valve piston including a first opening to the bypass channel on a casing side and a second opening to the fluid channel on the casing side.

2. The fluid supply system as claimed in claim 1, wherein the fluid supply system is configured as a lubricant supply system.

3. The fluid supply system as claimed in claim 1, wherein the detection device is configured as a temperature detection device and the control device is configured to close the switchable valve when a temperature of the fluid is 117° C. or greater.

4. The fluid supply system as claimed in claim 3, wherein the leakage opening is arranged in a floor of the valve piston.

5. The fluid supply system as claimed in claim 1, wherein the leakage opening is arranged in a floor of the valve piston.

6. The fluid supply system as claimed in claim 1, wherein the valve body is composed of at least one of metal and plastic.

7. The fluid supply system as claimed in claim 1, wherein the component is configured as one of a cooler device, a transmission device, and a filter device.

8. An internal combustion engine comprising a fluid supply system including:
   a component;
   a bypass valve including a valve body arranged in a control channel, the valve body being adjustable at least between a first position and a second position, the valve body cutting off a fluid channel to the component when in the first position and cutting off a bypass channel bypassing the component when in the second position, the valve body dividing the control channel into a first chamber and a second chamber, the valve body including a leakage opening connecting the first chamber and the second chamber;
   a spring element arranged within the second chamber configured to pretension the valve body in the second position;
   a fluid reservoir connected to the second chamber via a leakage channel;
   a switchable valve structured as a solenoid valve, arranged in the leakage channel, and configured to at least one of i) at least partially open and ii) at least partially close the leakage channel; and
   at least one detection device configured to detect a property of a fluid and transmit the detected property to a control device, the control device configured to close the switchable valve to block the leakage channel when the detected property reaches a predefined condition;
   wherein the valve body is structured as a valve piston having a casing side, the valve piston including a first opening and second opening disposed on the casing side such that first opening is connectable to the bypass channel and the second opening is connectable to the fluid channel.

9. The internal combustion engine as claimed in claim 8, wherein the fluid supply system is configured as a lubricant supply system.

10. The internal combustion engine as claimed in claim 9, wherein the detection device is configured as a temperature detection device and wherein the control device is configured to close the switchable valve when a temperature of the fluid is 117° C. or greater.

11. The internal combustion engine as claimed in claim 8, wherein the fluid supply system is configured as an oil supply system.

12. The internal combustion engine as claimed in claim 8, wherein the detection device is configured as a temperature detection device and wherein the control device is configured to close the switchable valve when a temperature of the fluid is 117° C. or greater.

13. The internal combustion engine as claimed in claim 8, wherein the leakage opening is arranged in a floor of the valve piston.

14. The internal combustion engine as claimed in claim 8, wherein the valve body is composed of at least one of metal and plastic.

15. The internal combustion engine as claimed in claim 8, wherein the component is configured as one of a cooler device, a transmission device, and a filter device.

16. A fluid supply system comprising:
   a component;
   a bypass valve including a valve body and arranged in a control channel, the valve body being adjustable at least between a first position and a second position, the valve body cutting off a fluid channel to the component when in the first position and cutting off a bypass channel bypassing the component when in the second position, the valve body dividing the control channel into a first chamber and a second chamber, the valve body including a leakage opening connecting the first chamber and the second chamber;
   a spring element arranged within the second chamber configured to pretension the valve body in the second position;
   a fluid reservoir connected to the second chamber via a leakage channel; and
   a switchable valve structured as a solenoid valve, arranged in the leakage channel, and configured to at least one of i) at least partially open and ii) at least partially close the leakage channel; and
   at least one temperature detection device configured to detect a temperature of a fluid and transmit the detected temperature to a control device, the control device configured to close the switchable valve to block the leakage channel when the detected temperature reaches a predefined value;
   wherein the valve body is structured as a valve piston having a casing side, the valve piston including a first opening and second opening disposed on the casing side such that first opening is connectable to the bypass channel and the second opening is connectable to the fluid channel.

17. The fluid supply system as claimed in claim 16, wherein the fluid supply system is configured as a lubricant supply system.

18. The fluid supply system as claimed in claim 16, wherein the leakage opening is arranged in a floor of the valve piston.

19. The fluid supply system as claimed in claim 16, wherein the valve body is composed of at least one of metal and plastic.

20. The fluid supply system as claimed in claim 16, wherein the component is configured as one of a cooler device, a transmission device, and a filter device.

* * * * *